(12) United States Patent
Teague et al.

(10) Patent No.: US 10,677,958 B2
(45) Date of Patent: Jun. 9, 2020

(54) RESOLUTION OF DETECTION OF AN AZIMUTHAL DISTRIBUTION OF MATERIALS IN MULTI-CASING WELLBORE ENVIRONMENTS

(71) Applicant: Visuray Intech Ltd (BVI), Road Town, Tortola (VG)

(72) Inventors: Philip Teague, Houston, TX (US); Alex Stewart, San Francisco, CA (US)

(73) Assignee: Visuray Intech Ltd (BVI), Tortola (VG)

( * ) Notice: Subject to any disclaimer, the term of this patent is extended or adjusted under 35 U.S.C. 154(b) by 52 days.

(21) Appl. No.: 15/903,762

(22) Filed: Feb. 23, 2018

(65) Prior Publication Data

US 2018/0188411 A1 Jul. 5, 2018

Related U.S. Application Data

(60) Provisional application No. 62/463,412, filed on Feb. 24, 2017.

(51) Int. Cl.
*G01V 5/12* (2006.01)
*E21B 47/00* (2012.01)
(Continued)

(52) U.S. Cl.
CPC ............ *G01V 5/12* (2013.01); *E21B 47/0005* (2013.01); *E21B 49/00* (2013.01); *G01N 9/24* (2013.01);
(Continued)

(58) Field of Classification Search
None
See application file for complete search history.

(56) References Cited

U.S. PATENT DOCUMENTS

2016/0061991 A1* 3/2016 Berkcan ................ G01V 5/145
250/269.2

FOREIGN PATENT DOCUMENTS

| EP | 2569307 A1 | 6/2012 |
|---|---|---|
| WO | 2012/058579 A2 | 5/2012 |
| WO | 2016/032698 A1 | 3/2016 |

OTHER PUBLICATIONS

Notification of Transmittal of the International Search Report and the Written Opinion of the International Searching Authority, or the Declaration issued in the corresponding PCT International Application No. PCT/US2018/019512, dated May 11, 2018 (13 pages).

* cited by examiner

*Primary Examiner* — Hoon K Song
(74) *Attorney, Agent, or Firm* — Raymond E. Ferrera; Adams and Reese LLP

(57) ABSTRACT

An x-ray based evaluation tool for measurement of the density of material volumes within and surrounding un-cased, single, dual and multiple-casing wellbore environments is provided, the tool including at least an internal length comprising a sonde section, wherein said sonde section further comprises an x-ray source; a radiation shield for radiation measuring detectors; and a plurality of sonde-dependent electronics; wherein the tool uses x-rays to illuminate the formation surrounding a borehole, wherein the geometry, movement, and plurality of output source beams is selected by moveable collimated shielded sleeves, and a plurality of detectors are used to directly measure the density of the cement annuli and any variations in density within. Various electromagnetic radiation detectors, shields, and practical internal configurations and subsystems and methods of use thereof are also provided.

18 Claims, 5 Drawing Sheets

(51) Int. Cl.
   *E21B 49/00*     (2006.01)
   *G01V 11/00*     (2006.01)
   *G01N 9/24*      (2006.01)
   *G01V 5/08*      (2006.01)
   *E21B 41/00*         (2006.01)
   *E21B 43/04*         (2006.01)
   *E21B 43/08*         (2006.01)

(52) U.S. Cl.
   CPC ................ *G01V 5/08* (2013.01); *G01V 11/00* (2013.01); *E21B 41/0085* (2013.01); *E21B 43/04* (2013.01); *E21B 43/08* (2013.01); *E21B 47/00* (2013.01)

RESOLUTION OF DETECTION OF AN AZIMUTHAL DISTRIBUTION OF MATERIALS IN MULTI-CASING WELLBORE ENVIRONMENTS

FIELD OF THE INVENTION

The present invention relates generally to methods and means for improving resolution of detection of an azimuthal distribution of materials, and in a particular though non-limiting embodiment to methods and means for improving resolution of detection of an azimuthal distribution of materials in multi-casing wellbore environments.

BACKGROUND

Within the oil and gas industry, gauging cement quality through multiple casings and determining the status of the annuli are of paramount importance. The industry currently employs various methods verifying the hydraulic seal behind a single casing string. Typically, ultrasonic tools are run within the well to determine whether cement bonded to the outside of the casing, thereby indicating the presence of cement in the annulus between the casing and formation, or between the casing and an outer casing. Ultimately, a leak-off pressure test ensures achievement of zonal isolation. To work correctly, ultrasonic tools depend upon casing quality, the bond between the casing and the material in the annulus, and the mechanical properties of the material in the annulus. In addition, ultrasonic tools treat the material in the annulus as a single isotropic and homogenous volume, and any actual deviation from this ideal leads to measurement inaccuracies.

Current tools offer information regarding the cement bond of the innermost casing, yet fail to discriminate various depths into the cement or annular material. This leads to the possible existence of fluid migration paths at the cement-formation boundary, within the cement itself, or between the casing and an outer casing, thereby leading to a loss of zonal isolation.

No viable technologies currently allow determination of the azimuthal position of anomalies within the annular region up to the cement formation boundary to ensure no fluid-paths exist risking zonal isolation and well integrity. In addition, no viable technologies allow determination of the radial position of anomalies located within an annulus not immediately outside of the inner casing.

Prior art teaches a variety of techniques using x-rays or other radiant energy to inspect or obtain information about structures within or surrounding the borehole of a water, oil or gas well, yet none teach of a method accurately analyzing the azimuthal position of anomalies in the annular materials surrounding a wellbore in single or multi-string cased well environments. In addition, none teach of a method accurately analyzing the azimuthal position of anomalies with a means including a centralized (non-padded) tool concentric with the well casing, rather than being a padded tool requiring the source and detector assemblies contact said casing.

For example, U.S. Pat. No. 3,564,251 to Youmans teaches of using an azimuthally scanning collimated x-ray beam to produce an attenuated signal at a detector to produce a spiral-formed log of the inside of a casing or borehole surface immediately surrounding the tool, effectively embodied as an x-ray caliper. However, the reference fails to teach of a means or method to achieve such through the steel wall of single or multiple well casings, and therefore fails to discriminate between signals behind said casings and annular materials, such as cement.

U.S. Pat. No. 7,675,029 to Teague et al. teaches an apparatus measuring x-ray backscattered photons from any horizontal surface inside of a borehole referring to two-dimensional imaging techniques.

U.S. Pat. No. 7,634,059 to Wraight provides an apparatus measuring two-dimensional x-ray images of the inner surface inside of a borehole without the technical possibility of viewing the inside of the borehole in a radial direction. The reference fails, however, to teach of a means or method to achieve these images through the steel wall of single or multiple well casings, and therefore fails to discriminate between signals behind said casings and annular materials, such as cement.

U.S. Pat. No. 8,481,919 to Teague teaches of a method of producing Compton-spectrum radiation in a borehole without using radioactive isotopes, and further describes rotating collimators around a fixed source installed internally to the apparatus, but does not have solid-state detectors with collimators. It further teaches of using conical and radially symmetrical anode arrangements to permit panoramic x-ray radiation production. However, the reference fails to teach of a means or method achieving such through the steel wall of single or multiple well casings, and therefore fails to discriminate between signals behind said casings and annular materials, such as cement. The reference also fails to teach of a non-padded (i.e., concentric) tooling technique within a single or multi-string cased hole environment.

US 2013/0,009,049 by Smaardyk provides an apparatus allowing measurement of backscattered x-rays from the inner layers of a borehole. However, the reference fails to teach of a means or method achieving such through the steel wall of single or multiple well casings, and therefore fails to discriminate between signals behind said casings and annular materials, such as cement.

U.S. Pat. No. 8,138,471 to Shedlock provides a scanning-beam apparatus based on an x-ray source, a rotatable x-ray beam collimator and solid-state radiation detectors enabling the imaging of only the inner surfaces of borehole casings and pipelines. However, the reference fails to teach of a means or method achieving such through the steel wall of single or multiple well casings, and therefore fails to discriminate between signals behind said casings and annular materials, such as cement.

U.S. Pat. No. 5,326,970 to Bayless provides a tool measuring backscattered x-rays from inner surfaces of a borehole casing with a linear accelerator based x-ray source. The reference fails, however, to teach of a means or method measuring scatter through the steel wall of single or multiple well casings, and therefore fails to discriminate between the signals behind said casings and annular materials, such as cement.

U.S. Pat. No. 7,705,294 to Teague provides an apparatus measuring backscattered x-rays from the inner layers of a borehole in selected radial directions with missing segment data populated through movement of the apparatus through the borehole. The apparatus permits data generation for a two-dimensional reconstruction of the well or borehole. However, the reference teaches only of the direction, as opposed to the needed geometry, of the illuminating x-ray beams for determining the depth from which the backscattered photons originated.

U.S. Pat. No. 5,081,611 to Hornby teaches a method of back projection to determine acoustic physical parameters of the earth formation longitudinally along the borehole using a single ultrasonic transducer and a number of receivers, which are distributed along the primary axis of the tool.

U.S. Pat. No. 6,725,161 to Hillis teaches of a method of placing a transmitter in a borehole and a receiver on the surface of the earth, or a receiver in a borehole and a transmitter on the surface of the earth, with the aim to determine structural information regarding the geological materials between the transmitter and receiver.

U.S. Pat. No. 6,876,721 to Siddiqui teaches a method of correlating information taken from a core-sample with information from a borehole density log. The core-sample information derives from a CT scan of the core-sample, whereby the x-ray source and detectors are located on the outside of the sample, and therefore configured as an outside-looking-in arrangement. Various kinds of information from the CT scan such as its bulk density is compared to and correlated with the log information.

U.S. Pat. No. 4,464,569 to Flaum claims a method of determining the elemental composition of earth formations surrounding a well borehole by processing detected neutron capture gamma radiation emanating from the earth formation after neutron irradiation of the earth formation by a neutron spectroscopy logging tool.

U.S. Pat. No. 4,433,240 to Seeman presents a borehole logging tool detecting natural radiation from the rock of the formation and logs said information for representation in an intensity versus depth plot format.

U.S. Pat. No. 3,976,879 to Turcotte describes a borehole logging tool using a pulsed electromagnetic energy or photon source to detect and record the backscattered radiation from the formation surrounding the borehole, and represent that characteristic information in an intensity versus depth plot format.

U.S. Pat. No. 9,012,836 to Wilson et al. describes a method and means for creating azimuthal neutron porosity images in a wireline environment. Similar to U.S. Pat. No. 8,664,587, the reference discusses arrangement of azimuthally static detectors implemented in a wireline tool assisting an operator's interpretation of post-fracking logs by subdividing the neutron detectors into a plurality of azimuthally arranged detectors shielded within a moderator to infer directionality to incident-neutrons and gamma.

U.S. Pat. No. 4,883,956 to Manente et al. provides methods for investigating subsurface earth formations using an apparatus adapted for movement through a borehole. Depending upon the formation characteristic or characteristics to be measured, the apparatus includes a natural or artificial radiation source for irradiating the formations with penetrating radiation such as gamma rays, x-rays or neutrons. A scintillator produces light in response to detected radiation and then generates and records a signal representative of at least one characteristic of the radiation.

U.S. Pat. No. 6,078,867 to Plumb claims a method for generating a three-dimensional graphical representation of a borehole, comprising: receiving caliper data relating to the borehole, generating a three-dimensional wire mesh model of the borehole from the caliper data, and color mapping the three-dimensional wire mesh model from the caliper data based on either borehole form, rugosity and/or lithology.

U.S. Pat. No. 3,321,627 to Tittle teaches of a system of collimated detectors and collimated gamma-ray sources to determine the density of a formation outside of a borehole and represented in a density versus depth plot format. However, the reference fails to teach of a means or method achieving such through the steel wall of single or multiple well casings.

SUMMARY

An x-ray based evaluation tool for measurement of the density of material volumes within and surrounding uncased, single, dual and multiple-casing wellbore environments is provided, the tool including at least an internal length comprising a sonde section, wherein said sonde section further comprises an x-ray source; a radiation shield for radiation measuring detectors; and a plurality of sonde-dependent electronics; wherein the tool uses x-rays to illuminate the formation surrounding a borehole, wherein the geometry, movement, and plurality of output source beams is selected by moveable collimated shielded sleeves, and a plurality of detectors are used to directly measure the density of the cement annuli and any variations in density within. Various electromagnetic radiation detectors, shields, and practical internal configurations and subsystems and methods of use thereof are also provided.

BRIEF DESCRIPTION OF SEVERAL EXAMPLE EMBODIMENTS

The present invention comprises methods and means for improving the resolution and determination of the density of the materials surrounding a wellbore, in a package requiring no direct physical contact with the well casings (i.e., non-padded). The method and means described herein comprise using an actuated combination of collimators located cylindrically around an x-ray source, located within a non-padded concentrically-located borehole logging tool, for detecting density variations within the annular materials surrounding a borehole within single or multi-string cased-hole environments.

The actuation of collimators permits the operator to choose between a fixed collimator mode in which the output is an azimuthal array of a plurality of x-ray beams, and an actuated collimator mode in which a single or plurality of individual azimuthally-arranged x-ray beams scan azimuthally through the rotation of one of the collimators. In addition, said actuation permits the operator to select a further non-rotating-mode in which the collimator sleeve switches among various angles or declinations of x-ray beam outputs with respect to the major axis of the tool.

An example method comprises known and new technologies combined in a new application for radiation physics and cement and casing measurements used within the oil and gas industry. The example method is further embodied by a means used to practice the method for use in a water, oil or gas well. This example method benefits the monitoring and determination of cement integrity, zonal isolation and well integrity, within cemented single or multi-string wellbore environments.

Figure 1:
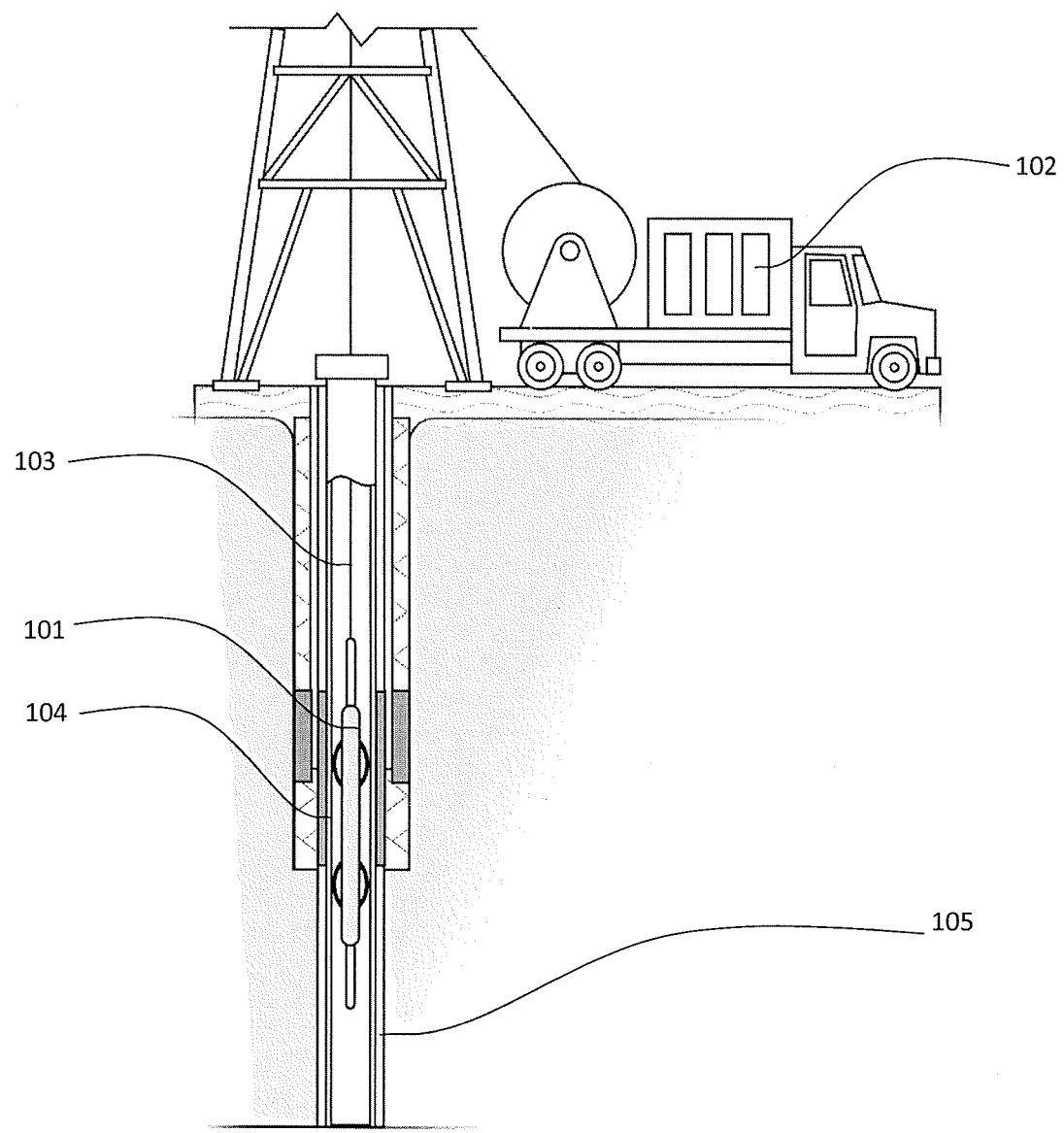
FIG. 1 illustrates an x-ray based cement evaluation tool deployed by wireline conveyance into a borehole, wherein the density of the cemented annuli is measured by the tool.

With reference now to the attached Figures, FIG. 1 illustrates an x-ray based cement evaluation tool [101] deployed by wireline conveyance [102, 103] into a borehole [105], wherein the density of the cemented annuli [104] is measured by the tool [101].

Figure 2:
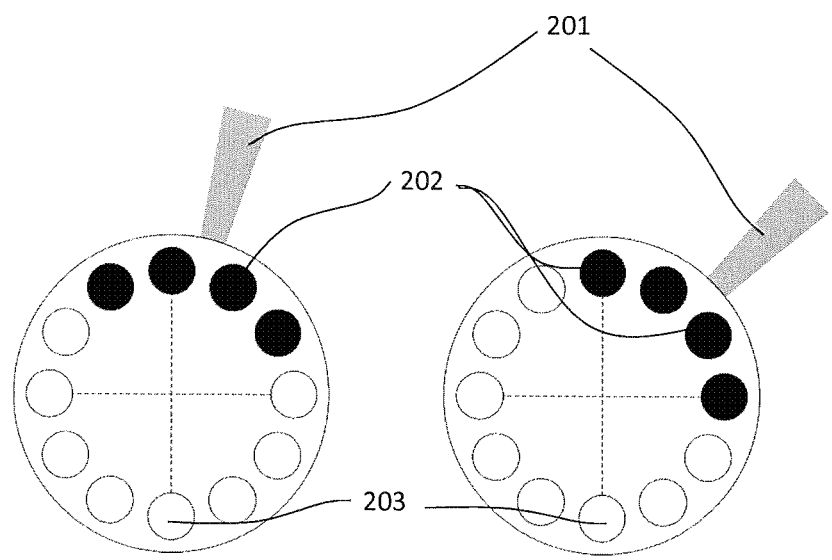
FIG. 2 illustrates an azimuthal plurality of detectors sampled selectively, such that their output relates specifically to the signal received by the interaction of a single azimuthally rotating x-ray beam, with the annular materials surrounding the wellbore within a single or multi-string cased hole environment.

FIG. 2 illustrates an azimuthal plurality of detectors [202, 203] sampled selectively [202], such that their output relates specifically to the signal received by the interaction of a single azimuthally rotating x-ray beam [201], with the annular materials surrounding the wellbore within a single or multi-string cased hole environment.

Figure 3:
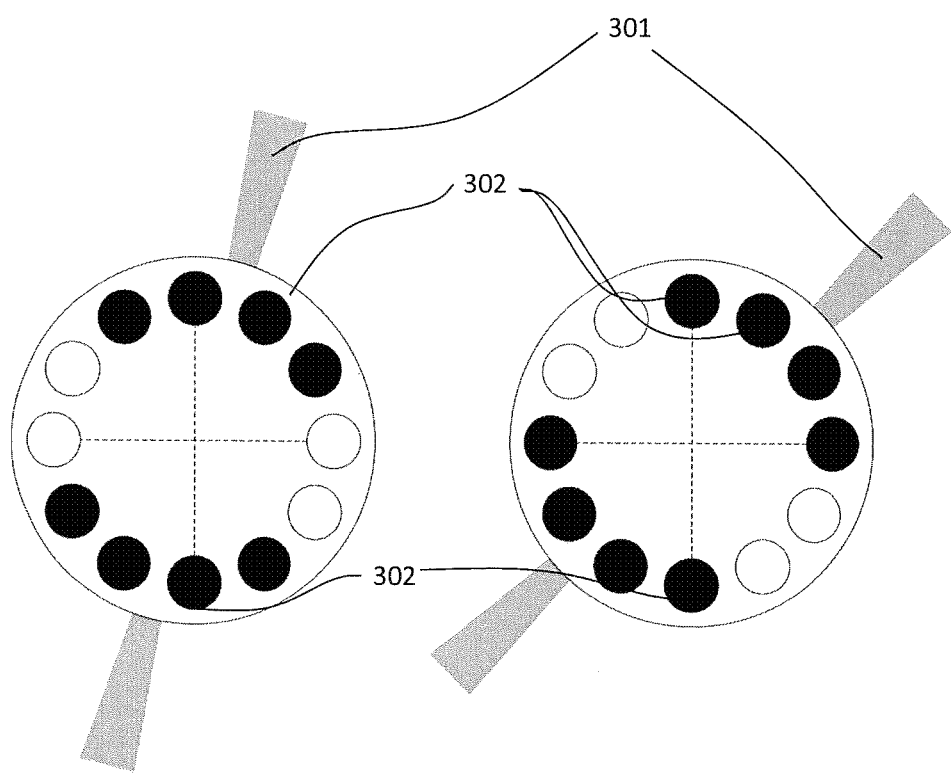
FIG. 3 illustrates an azimuthal plurality of detectors sampled selectively, such that their output relates specifically to the signal received by the interaction of a plurality of azimuthally rotating x-ray beams, with the annular materials surrounding the wellbore within a single or multi-string cased hole environment.

FIG. 3 illustrates an azimuthal plurality of detectors sampled selectively [302], such that their output relates specifically to the signal received by the interaction of a plurality of azimuthally rotating x-ray beams [301], with the annular materials surrounding the wellbore within a single or multi-string cased hole environment. The benefit here would be to double the data collection rate fora given axial logging speed. The result would be a double helical log.

Figure 4:
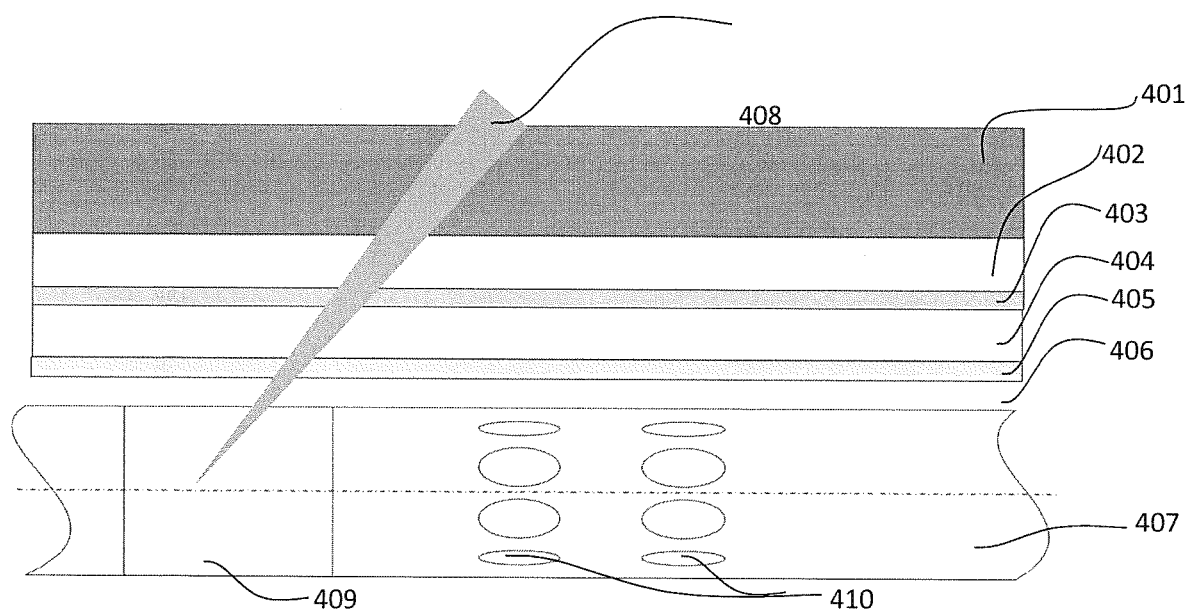
FIG. 4 illustrates an x-ray source and detectors located within a tool housing.

FIG. 4 illustrates an x-ray source and detectors [410] located within a tool housing [407]. The tool is located within a fluid [406] filled cased borehole. The first casing [405] is bonded to a second casing [403] by a cement [404] filled annulus. The second casing [403] is bonded to the formation [401] by a second cement [402] filled annulus. The rotating collimator [409] results in the azimuthal sweep of the x-ray beam [408] that permits an increase of the discrete resolving power of the azimuthal location of density variations in the annular materials [401, 402, 403, 404, 405] surrounding the wellbore. An axial plurality of fixed collimated detector sets [410] can be used to measure the multiple-scatter signal resulting from the interaction of the beam [408] with the casings [403, 405] and annular materials [401, 402, 404, 406].

Figure 5:
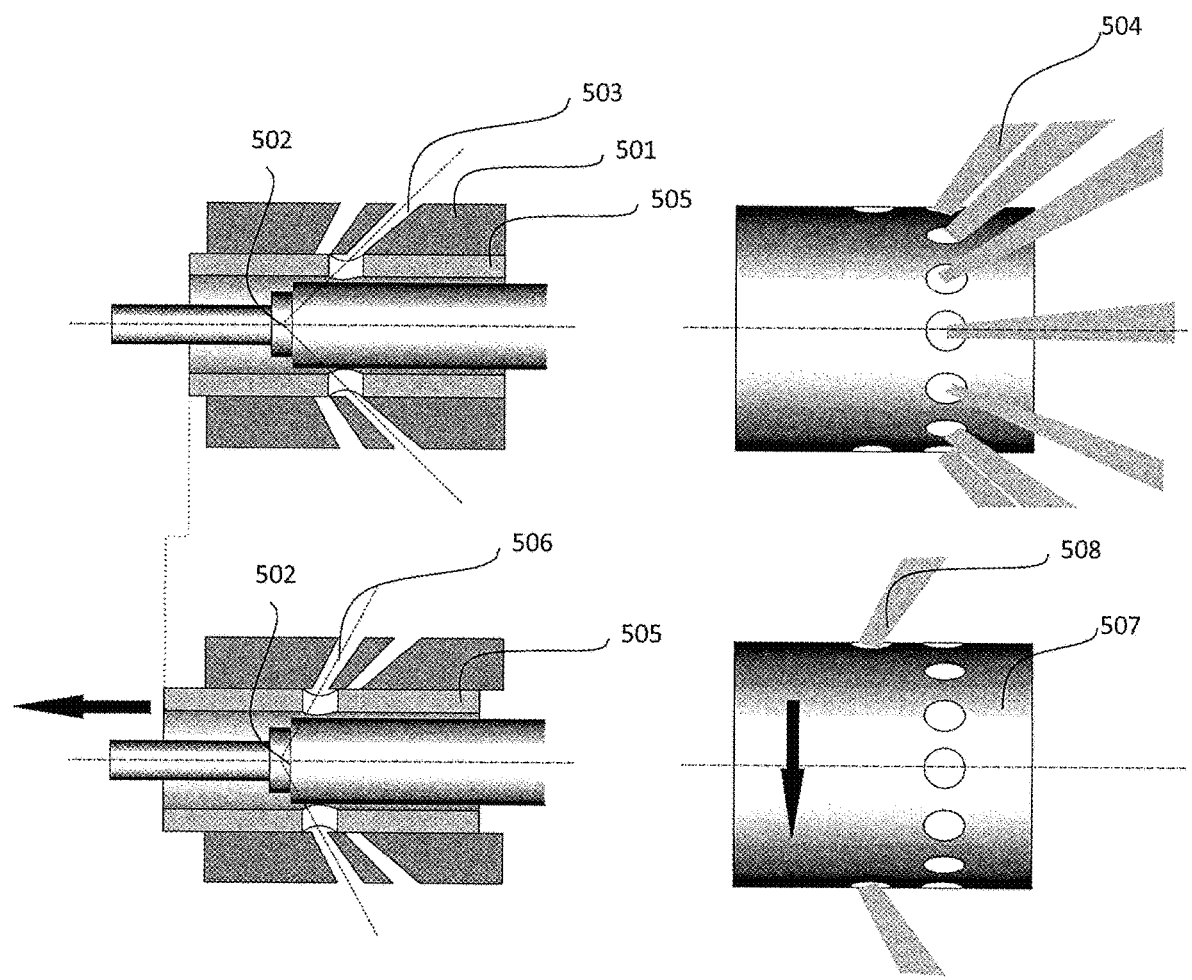
FIG. 5 illustrates collimator sleeves actuated to enable the selection of varying x-ray beam output modes.

FIG. 5 illustrates collimator sleeves [505, 507] actuated to select varying x-ray beam output modes. In-one embodiment, a non-rotating plurality of azimuthally located x-ray beams [504] is selected by actuating a shielded collimator sleeve [505], and maintaining another coaxial shielded collimator sleeve [501] stationary. This results in a selectable arrangement of shields [501, 505] enabling a specific collimation arrangement between the source [502] and the source collimator window [503]. In another embodiment, a single or multi-element azimuthally rotating beam [508] is selected by actuating a shielded collimator sleeve [505], and rotating another coaxial shielded collimator sleeve [507]. This results in a selectable arrangement of shields [505,507] enabling a specific collimation arrangement between the source [502] and the source collimator window [506], and yields a light-house effect with an azimuthally rotating single or plurality of x-ray beams.

In one embodiment, an x-ray based cement evaluation tool [101] is deployed by wireline conveyance [102, 103] into a borehole [105], wherein the density of the cemented annuli [104] is measured by the tool [101].

In a further embodiment, cylindrical collimators give directionality to an x-ray source output located within the pressure housing of a borehole logging tool. The x-ray source and detectors [410] are located within a tool housing [407]. The tool is located within a fluid [406] filled cased borehole. The first casing [405] is bonded to a second casing [403] by a cement [404] filled annulus. The second casing [403] is bonded to the formation [401] by a second cement [402] filled annulus. The rotating collimator [409] results in the azimuthal sweep of the x-ray beam [408] increasing the discrete resolving power of the azimuthal location of density variations in the annular materials [401, 402, 403, 404, 405] surrounding the wellbore. An axial plurality of fixed collimated detector sets [410] measures the multiple-scatter signal resulting from the interaction of the beam [408] with the casings [403,405] and annular materials [401, 402, 404, 406]. An-x-ray beam or plurality of beams, rotating azimuthally around the major axis of the bore tool, interacts with the annular materials surrounding the wellbore within a single or multi-string cased hole environment, producing both single and multi-scatter responses depending upon the axial offset of a plurality of fixed detectors employed to measure incoming photons resulting from said scatter.

A further embodiment switches collimation modes such that the tool changes between a fixed-output mode and a lighthouse azimuthally scanning mode, without removing the tool from the well for reconfiguration. The collimator sleeves actuate to select varying x-ray beam output modes. In the preferred embodiment, an inner non-rotating collimator actuates axially such that the x-ray source output is directed toward an azimuthal arrangement of beam-exit windows without an outer cylindrical collimator. The arrangement configured such to produce a non-rotating plurality of azimuthally located x-ray beams. Upon axial actuation of the inner sleeve and rotation of the outer sleeve by a motor or the like, the resulting arrangement produces a single or multi-element azimuthally rotating beam. In a further embodiment, the outer cylindrical collimator is not rotated, but the inner collimator is modulated, such that the angle of the x-ray beam(s) changes between different angles as compared to the major axis of the tool, thereby permitting means of a coded aperture technique to help improve radial resolving power and determine radial positioning of density variations of materials surrounding tool in the wellbore. The collimator sleeves [505, 507] actuate to select varying x-ray beam output modes. In one embodiment, a non-rotating plurality of azimuthally located x-ray beams [504] is selected by actuating a shielded collimator sleeve [505] and maintaining another coaxial shielded collimator sleeve [501] stationary, resulting in a selectable arrangement of shields [501, 505] enabling a specific collimation arrangement between the source [502] and the source collimator window [503]. In another embodiment, a single or multi-element azimuthally rotating beam [508] is selected by actuating a shielded collimator sleeve [505] and rotating another coaxial shielded collimator sleeve [507], resulting in a selectable arrangement of shields [505, 507] enabling a specific collimation arrangement between the source [502] and the source collimator window [506], and yielding a light-house effect with an azimuthally rotating single or plurality of x-ray beams.

In a further embodiment, one axially offset set of azimuthally distributed collimated detectors may be sampled such that the number of counts relating to the interaction of the x-ray beam(s), with the annular materials surrounding the wellbore, attribute directly to interaction of a specific azimuthally rotating beam. An azimuthal plurality of detectors [202, 203] can be sampled selectively [202], such that their output relates specifically to the signal received by the interaction of a single azimuthally rotating x-ray beam [201], with the annular materials surrounding the wellbore within a single or multi-string cased hole environment.

In a further embodiment, an azimuthal plurality of detectors is sampled selectively [302] such that their output relates specifically to the signal received by the interaction of a plurality of azimuthally rotating x-ray beams [301] with the annular materials surrounding the wellbore within a single or multi-string cased hole environment. For example, in an arrangement of two azimuthally rotating x-ray beams [301] situated 180 degrees apart azimuthally, the benefit would be to double the data collection rate for a given axial logging speed. The result would be a double helical log. In a further example, in an arrangement of 'n' azimuthally rotating x-ray beams [301] situated 360/n degrees apart azimuthally, the benefit would be to increase the data collection rate for a given axial logging speed by n. The result would be a helical log with 'n' twisted components.

The signal or combination of signals for that specific azimuth may be recorded and mapped with the aim of reproducing a three-dimensional density variation map of the solid angle of interaction of the x-ray beam with the annular materials surrounding the wellbore. This method of detector sampling groups that correlates positionally with the azimuthal position/direction of the x-ray beam(s), means that fixed detectors may be used in the place of detectors that must be rotated with the x-ray beam (to be able to discriminate the azimuthal direction of the incoming photons).

In one embodiment, the data collected from each azimuthal plane is processed to create a two-dimensional density map (e.g., pixels) of the materials extending out from the surface of the tool to a significant distance into the formation surrounding the borehole, thereby capturing all of the density data for the materials as a function of axial position and radial position. In a further embodiment, the data collected from each azimuth can be compared with neighboring azimuths to ascertain the azimuthal position of an anomaly, such that the two-dimensional maps can be amalgamated into a three-dimensional map (voxels) of the density data for the materials as a function of axial position, azimuthal and radial position.

In a further embodiment, the data collected from helical-azimuthal data collection from the detectors, as a result of a rotating source collimator, can be processed to create a two-dimensional density map (pixels) of the materials extending out from the surface of the tool to a significant distance into the formation surrounding the borehole, thereby capturing all of the density data for the materials as a function of axial position and radial position. In a further embodiment, the data collected from each 'azimuth' can be compared with neighboring azimuths to ascertain the azimuthal position of an anomaly, such that the two-dimensional maps can be amalgamated into a three-dimensional map (voxels) of the density data for the materials as a function of axial position, azimuthal and radial position.

In a further embodiment, all detectors are configured to measure energy spectra, such that the spectral information could be used to perform spectroscopic analysis of the materials surrounding the borehole for improved materials recognition. In a further embodiment, machine learning automatically analyzes the spectral (photo electric or characteristic energy) content of the logged data to identify key features, such as corrosion, holes, cracks, scratches, and/or scale-buildup. In a further embodiment, machine learning automatically analyzes the resulting data from historical logs produced by the same tool, to better determine the most optimum location to perform fracturing of the formation.

All embodiments allow for presentation of collected data as traditional 2D logs (as a function of depth), as a voxelated three-dimensional density model, or as slices or sections of such. In an alternative embodiment, machine learning further processes the data, such that a neural network is trained to look for signal abnormalities or by setting simple discriminators on the (calibrated) gradients and differences between axially offset detector group data collections. This technique becomes particularly powerful when combined with source voltage modulation, i.e., changing sensitivity functions. In a further embodiment, the tool determines the position, distribution and volume of fractures, either natural or artificial, within the formation surrounding the cased wellbore.

In a further embodiment, the tool [101] examines sand-screen structures to provide critical feedback to the operator regarding the status of said sand-screens. In a further embodiment, the tool [101] examines gravel-packs to provide critical feedback to the operator regarding the arrangement, location and structure of the gravel pack.

In a further embodiment, the tool is located within a legging-while-drilling (LWD) string rather than conveyed by wireline. In a further embodiment, mud turbines power the LWD provisioned tool [101]. In a further embodiment, batteries power the LWD provisioned tool.

In a further embodiment, the LWD provisioned tool determines the position, distribution and volume of fractures, either natural or artificial, within the formation surrounding the wellbore. In a further embodiment, the LWD provisioned tool determines whether the bottom-hole-assembly of the drilling apparatus remains within its desired geological bed by constantly measuring the azimuthal distribution of formation densities.

In a further embodiment, the tool [101] combines with other measurement tools such as neutron-porosity, natural gamma and/or array induction tools.

In a further embodiment, an azimuthally segmented acoustic measurement (such as to measure cement bond azimuthally) integrates into the tool, such that the quality of the cement bond to the first casing could be ascertained without the need for an additional tool or logging run.

An associated example method allows selection between a fixed axial (high speed) logging mode having a resolving power determined by the number of detectors in the azimuthal array and by the logging speed of the tool, and another mode permitting a spiral log approach, thereby increasing the azimuthal resolving power of the tool without needing to remove the tool from the borehole to permit reconfiguring. Such method allows actuation of the collimators such that the output x-ray beam angle (compared to the major axis of the tool) modulates and permits logging of multiple sensitivities to varying depths of investigation in a single pass. As the detector systems can be fixed (rotationally), there is no need to deal with the complexities of constructing the physical connections necessary to permit the rotation of the detector chassis.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray based evaluation tool for measurement of the density of material volumes within and surrounding un-cased, single, dual and multiple-casing wellbore environments, wherein said tool comprising:

an internal length comprising a sonde section, wherein said sonde section further comprises an x-ray source; a radiation shield for radiation measuring detectors; and a plurality of sonde-dependent electronics;

wherein the tool uses x-rays to illuminate a formation surrounding a borehole, wherein a geometry, movement, and plurality of output source beams is selected by moveable collimated shielded sleeves, and a plurality of detectors are used to directly measure a density of the cement annuli and any variations in density within; and wherein an x-ray source collimation angle is modified through actuated selection of collimated beam paths in a source-shield in order to modify an optimum detector axial offset and aid in creation of response sensitivity functions.

2. The tool of claim 1, wherein said shield further comprises tungsten.

3. The tool of claim 1, wherein the tool is configured so as to permit through-wiring.

4. The tool of claim 1, wherein the tool would be combinable would other measurement tools such as neutron-porosity, natural gamma and/or array induction tools.

5. The tool of claim 1, wherein an azimuthally segmented acoustic measurement may be integrated into the tool.

6. The tool of claim 1, wherein the tool is used to determine the position, distribution and volume of fractures, either natural or artificial, within the formation surrounding the cased wellbore.

7. The tool of claim 1, wherein the tool is integrated into a logging-while-drilling assembly.

8. The tool of claim 7, wherein the tool is powered by mud-turbine generators.

9. The tool of claim 7, wherein the tool is powered by batteries.

10. The tool of claim 1, further comprising a detector used to measure casing standoff such that other detector responses may be compensated for tool standoff and centralization.

11. The tool of claim 7, wherein said shield further comprises tungsten.

12. The tool of claim 7, wherein the tool is configured so as to permit through-wiring.

13. The tool of claim 7, wherein a plurality of reference detectors is used to monitor the output of the x-ray source.

14. The tool of claim 7, wherein a shortest-axial offset detector is configured to distribute incoming photons into energy classifications, such that photoelectric measurements may be made.

15. The tool in claim 7, wherein the x-ray source energy can be modulated to modify the optimum-detector axial offset to aid the creation of response sensitivity functions.

16. The tool in claim 7, wherein the tool is combinable would other measurement tools such as neutron-porosity, natural gamma and/or array induction tools.

17. The tool in claim 7, wherein an azimuthally segmented acoustic measurement is integrated into the tool.

18. The tool in claim 7, wherein the tool is used to determine the position, distribution and volume of fractures, either natural or artificial, within the formation surrounding the cased wellbore.

* * * * *